Inventor:
EUGEN BRUNNER

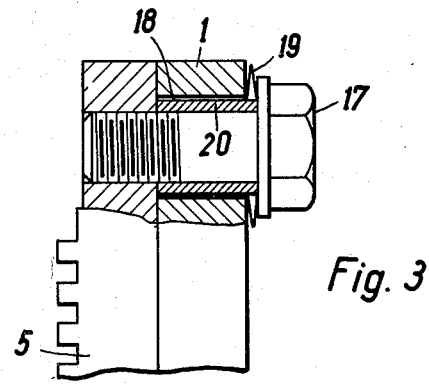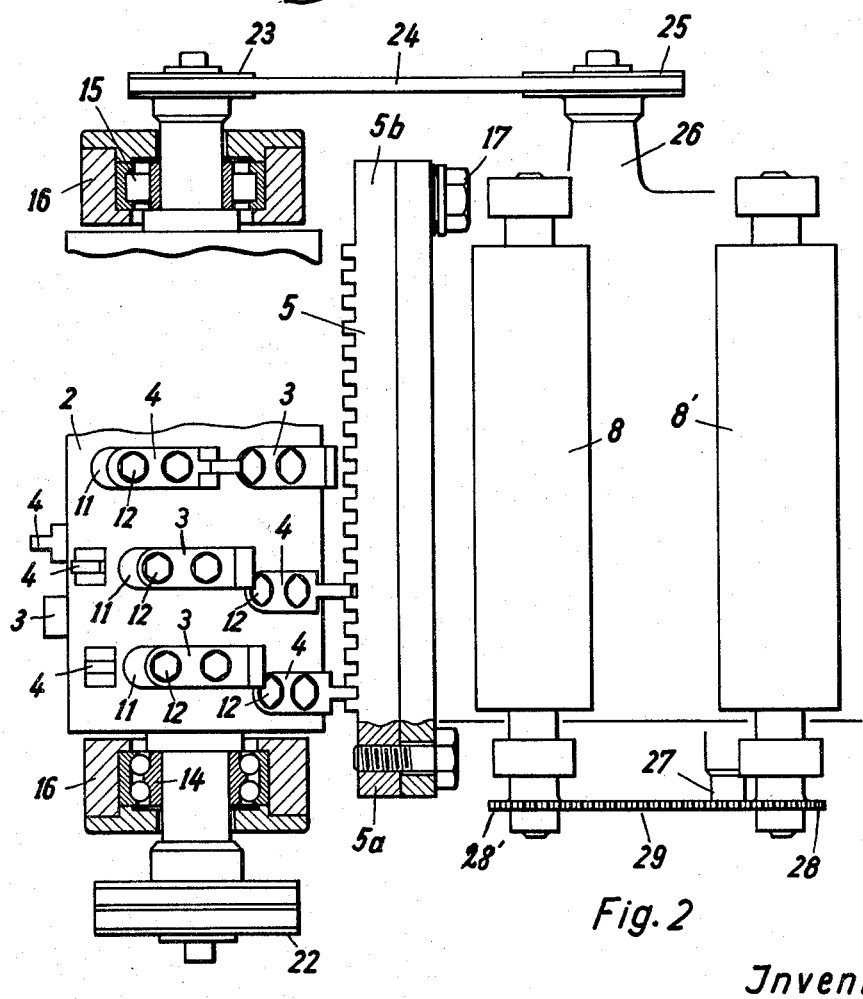

United States Patent Office 3,186,277
Patented June 1, 1965

3,186,277
GRANULATING APPARATUS FOR PLASTIC
SHEET MATERIAL
Eugen Brunner, Birsfelden, Switzerland, assignor to Lonza
Electrical and Chemical Works Limited, Gampel,
Wallis, Switzerland
Filed Oct. 14, 1960, Ser. No. 62,625
Claims priority, application Switzerland, Oct. 16, 1959,
79,542/59
6 Claims. (Cl. 83—355)

This invention relates to a granulating or dicing apparatus for plastic sheet material, and more particularly to a machine which is capable of subdividing a variety of plastic sheets and strips into separate particles or pellets.

Machines of this type are employed in the plastic industry to subdivide sheets or strips of plastic material such as polyvinylchloride, polyethylene, polypropylene and polystyrol into particles of a desired size and shape to be used in subsequent molding processes.

In prior art apparatus of this type several pairs of knives are secured to a rotary knife support. Each knife pair consists of a knife having rectangular teeth extending over the entire axial length of the knife support and of a straight-edge knife which extends also over the entire axial length of the knife support. The teeth of each of the toothed knives of the knife support are adapted to cooperate with the tooth recesses of the opposed bed knife. Each of the straight-edge knives cooperates with the front portion of all the teeth of the opposed bed knife.

In this prior art machine each cutting operation takes place over the entire width of the plastic sheet. Therefore the plastic sheet undergoes a strong stress during each cutting operation and an auxiliary device is necessary which urges the sheet material against the bed knife up to the base of the toothed recesses of this knife in order to assure a full abutment of the sheet material against the bed knife. In that same machine the tooth recesses of the toothed knife or fly knife of the knife support must be machined quite exactly and this relatively long knife must be adjusted with corresponding precision on the knife support. A subsequent sharpening of the toothed knives is difficult and if a mistake occurs during this sharpening operation the entire toothed knife must be replaced.

An additional drawback of that prior art machine is that it operates very noisily and has resonance tendencies because the knife pairs work in a rhythmic or periodic manner during the cutting operation. These resonance characteristics are a handicap for the machine particularly since the journaling of the knife support must be very precise in order to assure a proper cutting of the fly knives. The resonance characteristics affect not only the machine proper but also the plastic sheet or strip supported thereon especially the portion which extends over the teeth of the bed knife throughout the width of the apparatus. Particularly this portion of the plastic sheet is supposed to lie flush against the teeth of the bed knife and should not resonate or flutter in any manner in order to assure excellent cutting.

The granulating or dicing machine of this invention comprises a knife support which carries straight-edge knives as well as profiled knives. These knives are displaced with respect to each other, are individually replaceable and may be adjusted individually to extend a certain degree beyond the face of the knife support. According to the invention each straight knife extends only over a portion of the axial length of the knife support and cooperates with the front portion of at least two adjacent teeth of the opposed bed knife. Each profiled knife is adapted to cooperate with only one toothed recess of the opposed bed knife. The length of the teeth of the bed knife is greater than the advancing distance of the advancing mechanism which depends on the center angle of the knife support and by which angle similar knives of the knife support which cooperate with the same point of the opposed knife are displaced with respect to each other.

In view of the fact that in this machine each straight knife of the knife support extends only over a portion of the axial length of the knife support and cooperates only with the front portion of two adjacent teeth of the opposed bed knife, and each profiled knife cooperates with only one toothed recess of the opposed knife, and since additionally the knives of the knife support are displaced with respect to each other the sheet material is undergoing only a small stress during the granulating process. For the same reason indicated above this machine produces also less noise during operation. Preferably knives which cooperate with different longitudinal sections of the opposed bed knives are arranged on the knife support in such a manner as to be displaced with respect to each other by different center angles. This arrangement provides a non periodic cutting operation whereby resonance oscillations of the machine and of the plastic sheet are avoided. The lack of oscillations or vibrations and the small stress to which the sheet material is subjected make unnecessary a special device for pushing the sheet material against the opposed knife up to the base of the toothed recesses.

The profiled knives which are adapted to cooperate in each case with only one toothed recess of the opposed bed knife may be sharpened subsequently without difficulty and the adjusting of these profiled knives is particularly simple.

In order that each profiled knife cooperate in a dependable manner with the corresponding recess of the opposed bed knife even when the machine heats up during operation, the knife support and the stationary knife are preferably made of a material having approximately the same coefficient of expansion, and one end of the knife support and the adjacent end of the stationary knife are journaled without longitudinal play while the other end of the knife support and of the stationary knife are journaled axially slideably.

It is therefore an object of the invention to provide improved apparatus for subdividing plastic sheets and strips into completely separated particles or pellets.

It is another object of the invention to provide a cutting arrangement for subdividing apparatus of the type described which prevents undesirable oscillations or vibrations of the machine and the plastic sheet material during the cutting operation.

It is a further object of the invention to design a machine of the type described provided with rotary cutting means having an axial width substantially less than the width of the rotary knife support to improve the cutting operation and facilitate the sharpening and replacing of the rotary cutting means.

It is a further object of the invention to design a machine of the type described having rotary cutting means which are spaced axially and displaced angularly along the circumference of the rotary knife support to provide a smoother cutting operation generating less noise.

It is still a further object of the invention to design a machine of the type described which has a long operating life and provides dependable service.

Other objects and advantages of the granulating apparatus of this invention will be apparent from the following description when read in conjunction with the accompanying drawings in which an embodiment of the invention is shown by way of example only and in which:

FIGURE 2 shows a partly sectional top plan view of FIGURE 1 with the upper portion of the advancing mechanism omitted.

FIGURE 3 is a detail view of FIGURE 2 showing the adjusting arrangement for the bed knife.

Figure 1:
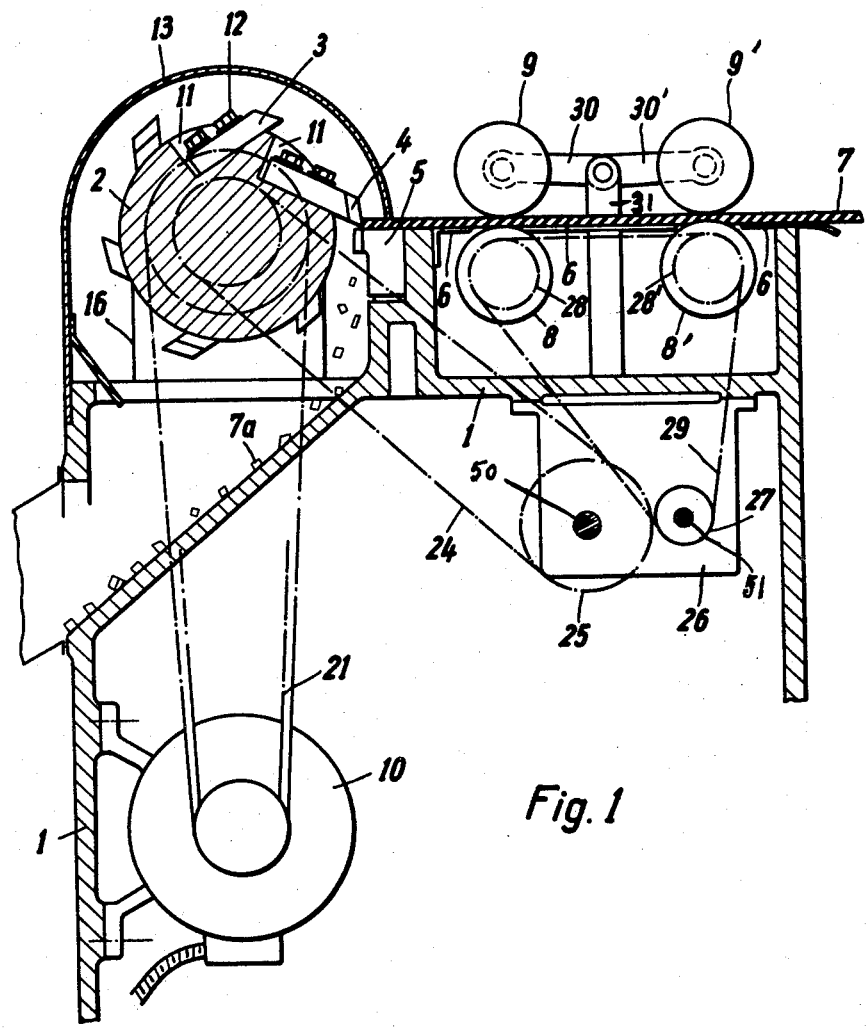
FIGURE 1 is a partly sectional side elevational view of the machine according to the invention with a plastic strip being fed through the machine.

Referring now particularly to FIGURE 1 the machine shown has a frame 1 on which a knife support 2 is rotatably mounted. Knife support 2 is of cylindrical form and carries knives 3 and 4. An opposed bed knife 5 which has rectangular shaped teeth is fixed to frame 1 and cooperates with knives 3 and 4. Bed plates 6 and 6' are mounted on frame 1 and support the plastic sheet or strip to be diced or granulated. The upper surface of these bed plates 6 and 6' lies in the same plane with the upper surface of bed knife 5. Two advancing or feeding rollers 8 and 8' and two biasing rollers 9 and 9' are provided to advance the plastic sheet 7. The knife support 2 and the feeding rollers 8 and 8' are driven by the same motor 10.

Each knife 3 has a straight cutting edge which cooperates with the front portion of two adjacent teeth of the opposed bed knife 5, while each profiled knife 4 cooperates with a toothed recess of the bed knife 5. All the knives 3 and 4 are arranged on the knife support 2 in an axially spaced and circumferentially displaced manner. Knives 3 and 4 are each secured to the base surface of a recess 11 provided in knife support 2 by means of screws 12. Screws 12 may be loosened and knives 3 and 4 adjusted to the position required for their optimum cooperation with the front portion of the corresponding teeth or with the corresponding recess of the bed knife 5. Knives 3 and 4 may be individually adjusted to their most suitable position and then secured by tightening screws 12. Profiled knives 4 are mounted into recesses 11 of knife support 2 without side play so that the adjusting process upon mounting the knives and upon replacing knives that are subsequently sharpened is simply an adjustment of the distance by which profiled knives 4 extend beyond the knife support. The adjusting process during the mounting of the straight knives 3 and during their remounting after being subsequently sharpened may be effected in the same easy manner. A slide play of straight knives 3 is not critical as long as their cutting edge extends properly into proximity of the front of the teeth of the bed knife 5 with which they cooperate in the working position. The proper distance can be determined in a very simple manner in that position of the knife support in which the knife to be adjusted, either 3 or 4, is located during the working operation relative to the cooperating cutting edges of the bed knife 5.

The knife support 2 is journaled axially without play at one end by means of a ball bearing 14, and at the other end in an axially slidable manner by means of a roller bearing 15. The bearings are mounted each on a bearing block 16 of the machine frame 1. Knife support 2 is enclosed by a protective hood 13. In a corresponding manner bed knife 5 is secured in a rigid manner to frame 1 at its end 5a adjacent bearing 14 and is longitudinally slidable with reference to frame 1 at its other end 5b.

Referring now to FIGURE 3 of the drawing a screw 17 is screwed into bed knife 5 at the end 5b of bed knife 5 and extends through a longitudinal hole or slot 18 of frame 1. Two plate springs 19 and 19' are inserted between the head of screw 17 and frame 1. A spacing sleeve 20 controls the distance between the head of screw 17 and bed knife 5 and the tension of plate springs 19. In view of the above described bearing arrangement of knife support 2 and the particular mounting arrangement of bed knife 5, profiled knives 4 cooperate perfectly with the recesses of the opposed bed knife 5 when knife support 2 and opposed bed knife 5, which are both of a material having an equal coefficient of expansion, become heated and expand during the operation of the machine.

Referring now more particularly to FIGURE 2, the electric motor 10 drives knife support 2 by means of a belt 21. The numeral 22 designates the corresponding belt sheave of knife support 2. Knife support 2 is connected over a sheave 23 and a sheave 25 mounted on the driving shaft 50 of a reduction drive 26 by means of a belt 24. The driving shaft 50 of reduction drive 26 has a sprocket 27 by means of which sprockets 28, 28' located on the shafts of the advancing rollers 8, 8' are driven through a chain 29. The biasing rollers 9, 9' are journalled in a pivoting manner on levers 30, 30' supported on a post 31. The rollers 9, 9' are rotated during the operation of the machine only under the effect of the advancing movement of plastic sheet 7.

Since in the machine shown each recess of bed knife 5 has one corresponding profiled knife and each two teeth of the knife 5 one corresponding straight-edge knife, all cuts made by this cooperation of the knives 3, 4 and 5 are executed one time per rotation of knife support 2. In this case the diameters of sheaves 23, 25 and of sprockets 27, 28 of feed rollers 8, 8' and the transmission ratio of the reduction drive 26 are so chosen that the plastic sheet 7 is moved during one rotation of knife support 2 by a feed length which is smaller than the length of the teeth of bed knife 5.

The knife support 2 may also have several profiled knives cooperating with the same toothed recess of bed knife 5 and correspondingly several straight knives may cooperate with the same two teeth of knife 2 wherein two similar knives of the knife support cooperating with the same point of the bed knife 5 must be uniformly distributed over its circumference. In this case the driving arrangement for the advancing rollers 8, 8' must be so calculated that the plastic sheet is moved during one rotation of the knife support 2 by the angle by which equivalent knives of the knife support cooperating with the same point of the opposed bed knife are spaced from each other by a feeding distance which is smaller than the length of the teeth of the bed knife 5.

The points for securing knives 3 and 4 are suitably distributed along one or more spiral lines on the surface of knife support 2 in such a manner that in all cases only one or simultaneously only few knives 3, 4 of the knife support cooperate with the bed knife 5. In this manner a small wear of bearings 14, 15 of the knife support 2 takes place. This is essential because the journaling of the knife support must be very precise so that the knives 3 and 4 cooperate in a sufficiently precise manner with the teeth of the bed knives.

The cutting edges of knives 3 and 4 are suitably provided with a hard metal surface, for instance with a hard metal surface having a tungsten carbide base.

In order to obtain with each rotation of the knife support 2 a non-periodic sequence of cutting operations, equivalent knives which are located on the knife support in an axially spaced manner may be displaced or stepped by varying center angles. In this manner a tendency for the machine and the plastic sheet 7 to produce resonance oscillations or vibrations is prevented.

The granules produced by the machine are designated by numeral 7a. A slide or ramp 31 is formed on the machine frame and the granules slide down this ramp and into a collector (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be applied, falling within the scope of the invention as claimed.

What is claimed is:
1. Apparatus for cutting a strip of sheet material into separate particles of a size smaller than the strip, comprising a stationary bed knife having rectangular teeth and individual rectangular recesses between the teeth,
a rotatable knife support arranged axially parallel to said bed knife,
straight knives supported by said knife support in axially and angularly spaced relation for cooperating each with the top of at least two teeth of said stationary bed knife and having a width substantially smaller than the width of said stationary bed knife,
profiled knives supported by said knife support in axially and angularly spaced relation for cooperating each with one of said recesses between said teeth of said stationary bed knife,
a plurality of straight grooves arranged on the surface of said knife support and extending perpendicularly to the axis of rotation thereof in axially and angularly spaced relation,
a shaft on each of said straight knives and said profiled knives, each of said shafts being slidable in one of said grooves for adjustment of said knives perpendicularly to the plane containing the axis of said knife support, said shafts of said knives fitting within said grooves without clearance in the direction of the axis of said knife support,
releasable fixing means for securing said shafts in adjusted position on said knife support,
feeding means for continuously feeding a strip of sheet material over said stationary bed knife, and
control means for controlling said feeding means in dependence of the rotation of said knife support to advance said strip a distance less than the length of said teeth of said bed knife during the time interval that two equivalent knives of said knife support cooperate with the same point on said stationary bed knife.

2. Apparatus for cutting a strip of sheet material into separate particles of a size smaller than the strip, comprising
a frame
an elongated stationary bed knife consisting of a material of predetermined coefficient of thermal expansion, and having rectangular teeth and individual rectangular recesses between the teeth, one end of said stationary bed knife being fixed to said frame without clearance and the other end being guided on said frame for movement in the lengthwise direction of said bed knife,
a rotatable knife support consisting of a material having a coefficient of thermal expansion equal to said coefficient of thermal expansion of the material of said bed knife,
said rotatable knife support being arranged with its axis of rotation parallel to said bed knife, one end of said knife support adjacent said first end of said bed knife being journalled on said frame without clearance, and the other end of said knife support adjacent said second end of said bed knife being slidably journalled on said frame for movement in the axial direction of said knife support,
straight knives supported by said knife support in axially and angularly spaced relation for cooperating each with the top of at least two teeth of said stationary bed knife and having a width substantially smaller than the width of said stationary bed knife,
profiled knives supported by said knife support in axially and angularly spaced relation for cooperating each with one of said recesses between said teeth of said stationary bed knife,
a plurality of straight grooves arranged on the surface of said knife support and extending perpendicularly to the axis of rotation thereof in axially and angularly spaced relation,
a shaft on each of said straight knives and profiled knives, each of said shafts being slidable in one of said grooves for adjustment of said knifes perpendicularly to the plane containing the axis of said knife support, said shafts of said knives fitting within said grooves without clearance in the direction of the axis of said knife support,
releasable fixing means for securing said shafts in adjusted position on said knife support,
feeding means for continuously feeding a strip of sheet material over said stationary bed knife, and
control means for controlling said feeding means in dependence of the rotation of said knife support to advance said strip a distance less than the length of said teeth of said bed knife during the time interval that two equivalent knives of said knife support cooperate with the same point on said stationary bed knife.

3. Apparatus as defined in claim 2 wherein said profiled knives and said straight knives are axially aligned in pairs on said knife support.

4. Apparatus as defined in claim 2 wherein said profiled knives and said straight knives are circumferentially aligned on said knife support.

5. Apparatus as defined in claim 2 wherein said profiled knives and said straight knives are circumferentially aligned on said knife support in an alternating relation.

6. Apparatus as defined in claim 2 wherein said profiled knives and said straight knives are circumferentially stepped on said knife support in an alternating relation.

References Cited by the Examiner
UNITED STATES PATENTS

| | | | |
|---|---|---|---|
| 148,203 | 3/74 | Gardiner | 83—504 |
| 286,535 | 10/83 | Everding | 83—906 |
| 864,552 | 8/07 | Perkins et al. | 83—355 |
| 1,567,920 | 12/25 | Cumfer | 83—355 |
| 1,623,983 | 4/27 | Speer | 83—300 |
| 1,874,902 | 8/32 | Clyne | 83—906 |
| 2,335,515 | 11/43 | Jehle | 83—349 |
| 2,655,213 | 10/53 | Anderson | 83—355 |
| 2,812,815 | 11/57 | Quinsey et al. | 83—906 |
| 2,819,747 | 1/58 | Hervin | 83—355 |

ANDREW R. JUHASZ, *Primary Examiner.*
CARL W. TOMLIN, LEON PEAR, *Examiners.*